Patented Oct. 11, 1927.

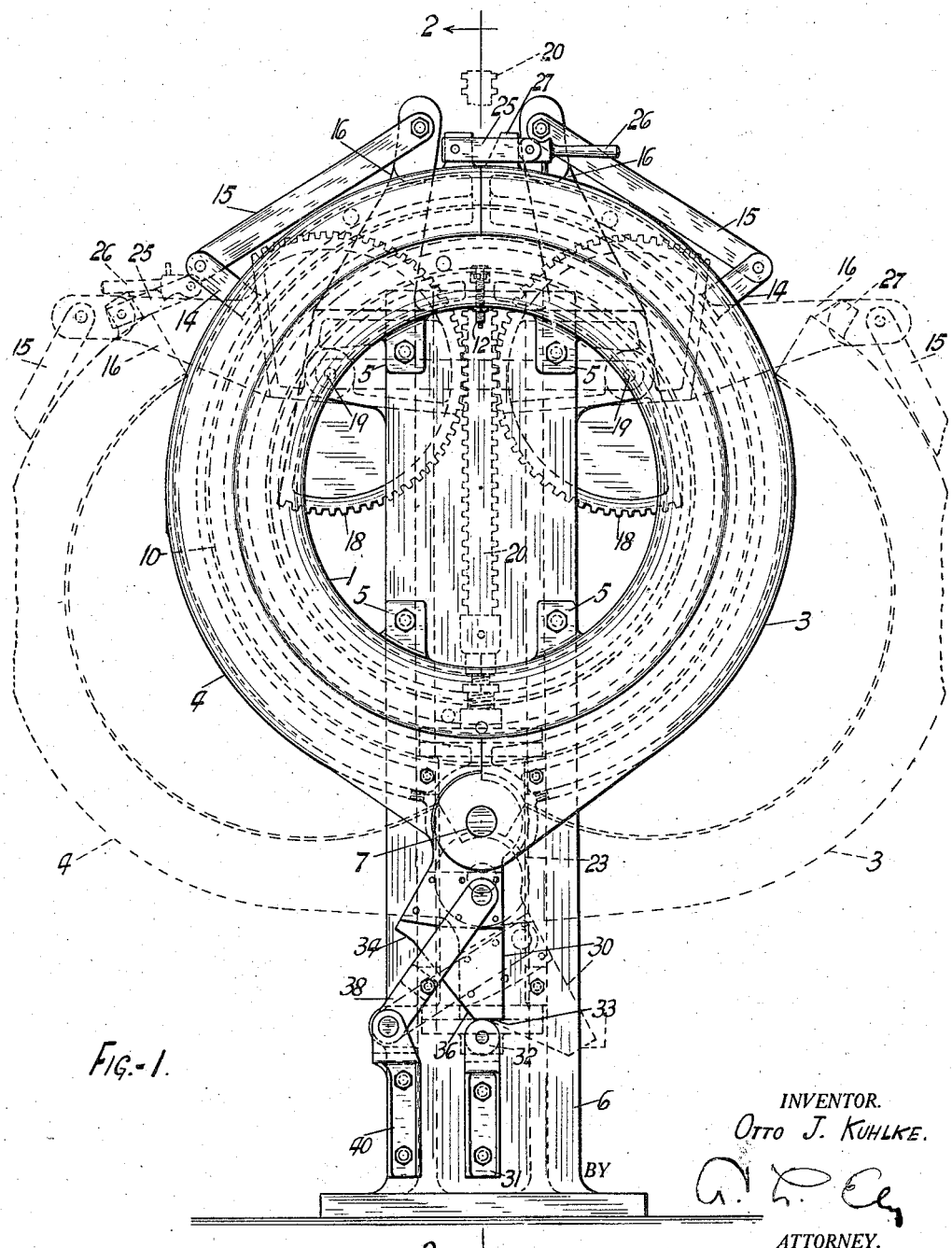

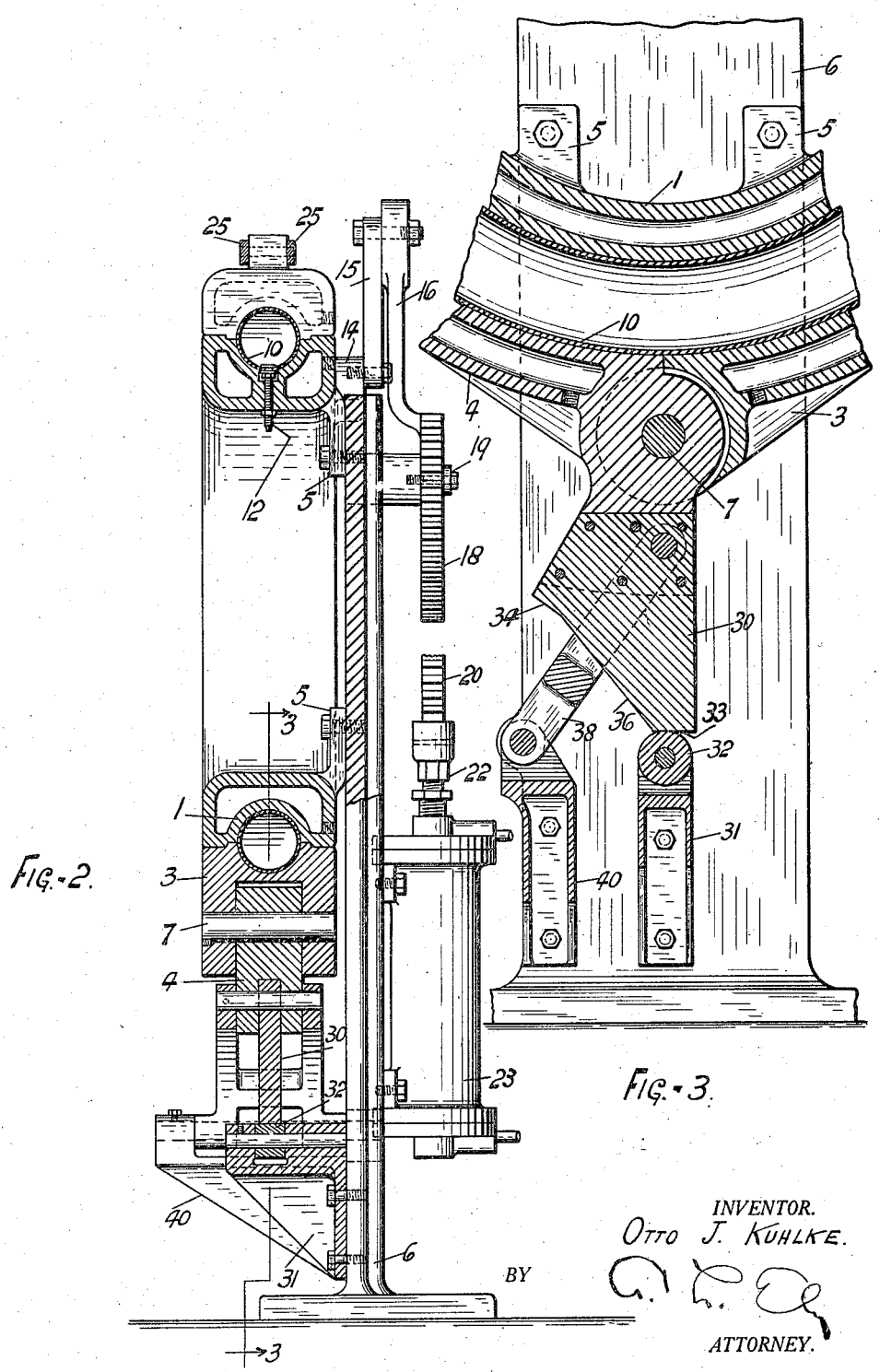

1,644,678

UNITED STATES PATENT OFFICE.

OTTO J. KUHLKE, OF AKRON, OHIO, ASSIGNOR TO THE KUHLKE MACHINE COMPANY, OF AKRON, OHIO, A CORPORATION OF OHIO.

APPARATUS FOR VULCANIZING INNER TUBES.

Application filed September 21, 1926. Serial No. 136,817.

The present invention relates to apparatus for use in the vulcanization of inner tubes for pneumatic tires.

The object of the invention is to improve upon apparatus for this general purpose, to provide a form of vulcanizer which can be easily and quickly operated, and will cure tubes more rapidly and efficiently than prior forms of apparatus for the purpose. It is also an object of the invention to devise a tube vulcanizer which will permit the insertion of the tube in such a manner as to eliminate all possibility of tube pinching and reduce the rind or overflow.

By the use of the apparatus as shown and described, the labor attendant upon placing the tubes within the vulcanizer and removing them therefrom is reduced to a minimum, and a better quality and grade of product is obtained than with prior devices for the purpose.

It will be understood that the showing and description contained herein is merely for the purpose of explaining a single, practical embodiment of the invention, the scope of which is more fully to be pointed out in the description and claims. Changes and modifications, therefore, may be suggested to those skilled in the art to which this invention appertains and such changes or modifications will be understood to be within the scope of the invention as set forth in the claims.

In the drawings in which one form of the invention is shown:

Figure 1 is a front elevation of the complete apparatus showing the vulcanizer in closed position and in open position in dotted lines;

Figure 2 is a vertical section in the line 2—2 of Figure 1; and

Figure 3 is a somewhat enlarged section of the lower portion of the apparatus on the section 3—3 of Figure 2.

One of the objects of the invention is to afford a device which is so designed that the tube can be easily and quickly placed within the mold, and in which the tube will seat largely by its own contractile properties. As a result there will be no tendency for the green unvulcanized tube to become pinched. This manner of dividing the mold is different from prior types which have heretofore been divided along a plane parallel to or substantially parallel to the plane of the tube. The present manner of dividing the mold along circumferential lines on either side of the tube between the inner and outer peripheries is new and has many advantages over the old method.

This object is accomplished by the manner in which the mold is divided, the mold comprising an inner ring or mold half 1, which constitutes a complete annular seat for the inner periphery of the tube. The outer portion of the mold is made in two equal segments 3 and 4, the former on the right and the latter on the left, the several sections, when brought together constituting the complete mold cavity. As the section of the mold 1 is a complete ring and having an annular trough like cavity about its outer periphery, the tube, which is made of green rubber, and partially inflated, can be easily inserted in the section 1 and will seat in the trough or cavity about the ring. It will be observed that the walls of the inner section 1 extend upwardly so that the outer diameters thereof extend to the median line of the finished tube and consequently slightly above the median line of the partially inflated tube so that the sides of the tube are fully supported by the walls of the inner sections and cannot overhang and be pinched upon closing the mold. When the sections 3 and 4, which are also provided with an annular cavity in their inner faces, are brought together by the mechanism which will be described, the closing of the mold is accomplished without danger of pinching the tube. One of the broader aspects of the invention consists of the manner in which the inner tube molding cavity is divided and the means for moving the outer sections towards and away from the inner section is not necessarily confined to the particular arrangement here shown, nor need the number and arrangement of outer sections be adhered to.

The inner section is preferably carried in an upright position being mounted by lugs 5 upon the face of a vertical standard or support 6. The outer sections 3 and 4 are hinged together at the lowermost point on the mold being connected by a horizontal hinge pin 7. The outer sections of the mold are opened and closed by any suitable mechanism the specific form herein shown and described being non-essential to those aspects of the invention which relate to the general design and arrangement of the mold.

The inner and outer sections of the mold are hollowed or chambered for the circulation of steam which furnishes the heat required for vulcanization, the necessary inlets and outlets being provided as required. The tube within the mold is indicated by the numeral 10, the inner section being provided with an aperture through which the valve stem 12 projects. The tube is partially inflated so that it will properly round out for positioning within the mold and is further inflated during vulcanization by air or water admitted through the valve stem.

In the present form of the invention two sections 3 and 4, constituting the expansible jacket for the vulcanizer, are rocked about the hinge pin so as to open the chamber and permit the placement and removal of the tube. At the same time it is necessary to shift the two sections 3 and 4 relative to the mold so as to insure easy access to the inner mold section. The mechanism for doing this will now be described.

On the upper end of each section is formed a lug 14 to which is pivoted a link 15. the links extending toward one another and being pivoted at their other ends to arms 16 which extend upwardly from gear segments 18 which are pivoted at 19 to the rear of the standard 6. The gear sections face one another and are in mesh with a vertically movable rack 20 which is carried upon the upper end of a piston 22 moved in a cylinder 23 which is secured to the rear of the standard. Fluid pressure is used to move the piston and as the rack 20 rises or falls the segments are rocked, which in turn opens or closes the sections 3 and 4 of the tube mold, the stroke of the piston limiting the outward swinging of the sections. In order to lock the sections 3 and 4 together a catch 25 is pivoted to one of the sections and is provided with a swinging cam lock 26 which engages with a lug 27 on the other swinging section.

It is necessary for the sections 3 and 4 to move away from the section 1 as well as to open and close and this is accomplished by so mounting these sections that as they open the whole unit will move downwardly from the section 1. In order to accomplish this result in the form shown, one of the swinging sections, here shown as the section 4, has secured to it a rigid cam plate 30, and secured to the front of the standard 6 is a bracket 31 which supports a bearing roller 32 on which the cam rides. It will be observed that the cam 30 has a horizontal surface 33 which bears against the roller when the mold sections are closed, and a surface 34 upon which the unit is supported when the sections are opened, as shown in dotted line position in Figure 1. These two surfaces are connected by an inclined surface 36 which travels over the roller 32 when the sections are being opened and closed. The cam being rigidly connected with the section 4 causes the travel of these surfaces over the cam during the rocking movement. In order to properly guide the sections of the mold a link 38 is pivotally connected at its upper end to the cam and at its lower end to a bracket 40 mounted in the standard.

The operation of the apparatus is as follows: The vulcanizer being open, as shown in dotted lines in Figure 1, the green, unvulcanized tube, partially inflated, is placed over the inner ring shaped mold section, the valve stem being inserted in position. The tube is thus easily and quickly placed in position and no part of the tube is liable to project beyond the ring in such position that it may be pinched. Pressure is then admitted to the cylinder and the rack 20 is lowered, which rocks the segments 18 and moves the sections 3 and 4 together, the complete jacket rising as well as closing due to the action of the cam 30. When the sections are closed the mold is locked by the cam lock and the tube is securely held within the mold. The tube is then inflated and will receive the required cure. The vulcanizer sections being heated at all times through the steam chambers therein, the operation of vulcanization is carried forward very rapidly. When the vulcanization is complete the mold is opened by a reversal of the operations.

The apparatus shown herein is highly successful in the field to which it is particularly adapted, but the features of invention contained therein are capable of wider range of operation as will be understood by those skilled in the art. The arrangement for supporting and moving the outside sections which constitute the jacket about the inner or stationary vulcanizer section gives a maximum range of movement to these parts so that ample clearance is provided for removal and replacement of the tube, but other mechanism may be designed operating upon similar principles and coming within the broad scope of the invention.

What is claimed is:

1. A vulcanizer comprising a stationary section and a pair of movable sections hinged together and means to rock the hinged sections toward and from the stationary section, comprising a movable piston, a rack carried thereby, gears meshing with the rack and arms connected to the gears and to the hinged sections.

2. A vulcanizer comprising a stationary section, a pair of movable sections hinged together and means to open and close the hinged sections about the stationary section comprising a movable rack, gears meshing with the rack and arms connected to the gears and to the hinged sections.

3. A vulcanizer comprising a stationary section, and a rocking section movable toward and away from the stationary section, a rack, a gear meshing with the rack and a link connected to the gear and to the hinged sections.

4. A vulcanizer comprising a stationary section, and a pair of movable sections hinged together and means to rock the hinged sections toward and from the stationary section, comprising a movable piston, a rack carried thereby, gears meshing with the rack and arms connected to the gears and to the hinged sections, and means to shift the hinged sections and stationary section relatively to one another during the movement of the former.

5. A vulcanizer comprising a stationary section, a pair of movable sections hinged together and means to open and close the hinged sections about the stationary section comprising a movable rack, gears meshing with the rack and arms connected to the gears and to the hinged sections, and means to shift the hinged sections and stationary section relatively to one another during the movement of the former.

6. A vulcanizer comprising a stationary section, and a rocking section movable toward and away from the stationary section, a rack, a gear meshing with the rack and a link connected to the gear and to the hinged sections and means to shift the hinged sections and stationary section relatively to one another during the rocking movement of the former.

7. In a device of the character described a stationary vulcanizer section and a pivoted vulcanizer section adapted to be rocked about its pivot toward and from the stationary section, a supporting roller therefor, a cam on the pivoted section resting upon the roller and movable thereon during the pivotal movement to bodily shift the section relative to the stationary section simultaneously with its rocking movement.

8. In a device of the character described a stationary vulcanizer section and a pivoted vulcanizer section adapted to be moved about its pivot toward and from the stationary section, a cam for supporting the pivoted section, the shape of the cam causing the pivoted section to shift bodily relatively to the stationary section simultaneously with its pivotal movement.

9. In a device of the character described a stationary vulcanizer section and a movable vulcanizer section capable of being moved toward and from the stationary section, a cam for supporting the movable section, the shape of the cam causing the movable section to shift bodily relative to the stationary section simultaneously with its first named movement.

10. In a device of the character described, a stationary vulcanizer section, and a jacket therefore comprising two sections hinged together and adapted to be moved about the hinge to open and close the jacket about the stationary section, a supporting roller for the jacket, and a cam on one of the sections thereof resting upon the roller and movable thereon during the opening and closing of the jacket to bodily shift the jacket relative to the stationary section.

11. In a device of the character described, a stationary vulcanizer section and a jacket therefor comprising two sections hinged together and adapted to be moved about the hinge to open and close the jacket about the stationary section, and a cam for supporting the jacket, the shape of the cam causing the jacket to bodily shift relatively to the stationary section simultaneously with the opening and closing of the jacket.

12. In a device of the character described, a stationary central vulcanizer section having a trough like recess about its outer periphery adapted to form a seat for the inner periphery of an inner tube, and an expansible jacket about the stationary section capable of being moved toward and from said section, said jacket being formed in segments hinged together and having a trough like recess about its inner surface adapted to complete the vulcanizing cavity, and a cam to shift the jacket relatively to the stationary section during the operations of the jacket.

13. In a device of the character described, a stationary central vulcanizer section having a trough like recess about its outer periphery adapted to form a seat for the inner periphery of an inner tube, and an expansible jacket about the stationary section capable of being moved toward and from said section, said jacket being formed in segments hinged together and having a trough like recess about its inner surface adapted to complete the vulcanizing cavity, and a cam on the jacket and a supporting roller over which the cam moves acting to shift the jacket relatively to the stationary section during the operations of the jacket.

14. In a device of the character described, a stationary vulcanizer section, a swinging vulcanizer section, a cam rigid with said swinging section, a roller for supporting the cam, and a swinging link also connected to the section and operable to maintain the cam in contact with the roller at all times during the swinging movement of the section.

15. In a device of the character described, a stationary vulcanizer section, a swinging vulcanizer section adapted to be swung toward and from the stationary section, a cam rigid with said swinging section, a roller for supporting the cam, and a swinging link also connected to the section and operable to maintain the cam in contact with the roller at all times during the swinging movement of the section, the surface of the cam being shaped to cause the swinging section to approach or recede from the stationary section.

16. A mold having a cavity therein for the shaping of an inner tube, the mold being separated to permit of removal and replacement of the tube along a surface which intersects the central plane of the tube, the inner portion of the mold thereby having a trough-shaped cavity about its outer surface in which the inner peripheral surface of the tube may seat due to its inherent contractile property, and the outer portion having a similarly trough-shaped cavity on its inner surface.

17. A mold having a cavity therein for the shaping of an inner tube, the mold being separated to permit of removal and replacement of the tube along a surface which intersects the central plane of the tube at approximately its median lines, the inner portion of the mold thereby having a trough-shaped cavity about its outer surface in which the inner peripheral surface of the tube may seat due to its inherent contractile property, and the outer portion having a similarly trough-shaped cavity on its inner surface.

18. A mold for the vulcanization of inner tubes, said mold comprising separable sections, one of which is an annular inner section having a trough shaped cavity, the walls of the inner section being of a diameter not less than the diameter of the median line of the green tube inflated substantially to size, so that the sides of the tube are supported by the inner section walls, and overhanging of the tube is eliminated prior to the closing of the mold sections.

19. A mold for the vulcanization of inner tubes, said mold comprising separable sections one of which is an annular heated inner section having a trough shaped cavity, the walls of the inner section being of a diameter not less than the diameter of the median line of the green tube inflated substantially to size, so that the sides of the tube are supported by the inner section walls and overhanging of the tube is eliminated prior to the closing of the mold sections.

OTTO J. KUHLKE.